(12) United States Patent
Diewald et al.

(10) Patent No.: US 9,342,312 B2
(45) Date of Patent: May 17, 2016

(54) PROCESSOR WITH INTER-EXECUTION UNIT INSTRUCTION ISSUE

(71) Applicant: TEXAS INSTRUMENTS DEUTSCHLAND GMBH, Freising (DE)

(72) Inventors: Horst Diewald, Freising (DE); Johann Zipperer, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 447 days.

(21) Appl. No.: 13/917,811

(22) Filed: Jun. 14, 2013

(65) Prior Publication Data

US 2014/0372733 A1    Dec. 18, 2014

(51) Int. Cl.
G06F 9/32    (2006.01)
G06F 9/38    (2006.01)

(52) U.S. Cl.
CPC ............ *G06F 9/3808* (2013.01); *G06F 9/3814* (2013.01); *G06F 9/3828* (2013.01); *G06F 9/3836* (2013.01); *G06F 9/3853* (2013.01); *G06F 9/3867* (2013.01); *G06F 9/3895* (2013.01)

(58) Field of Classification Search
CPC ........................................................ G06F 9/32
See application file for complete search history.

(56) References Cited

U.S. PATENT DOCUMENTS 8,756,404 B2 *    6/2014    Luick ................... G06F 9/3001
                                                           712/214

* cited by examiner

*Primary Examiner* — Cheng-Yuan Tseng
(74) *Attorney, Agent, or Firm* — John R. Pessetto; Frank D. Cimino (57) ABSTRACT

A processor includes an instruction storage memory, a processor core, and an instruction merge unit. The processor core includes a plurality of execution units coupled to the instruction storage memory. A first of the execution units is configured to execute instructions provided from the instruction storage memory via a first instruction path, and to execute instructions provided by a second of the execution units via a second instruction path. The second of the execution units is configured to execute instructions provided from the instruction storage memory, and to provide instructions for execution to the first of the execution units via the second instruction path. The instruction merge unit is configured to merge the instructions provided via the first and second instruction paths into a stream of instructions to be executed by the first execution unit.

22 Claims, 5 Drawing Sheets

PROCESSOR WITH INTER-EXECUTION UNIT INSTRUCTION ISSUE

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution units providing inter-execution unit instruction issue are disclosed herein. In one embodiment, a processor includes an instruction storage memory, a processor core, and an instruction merge unit. The processor core includes a plurality of execution units that are coupled to the instruction storage memory. A first of the execution units is configured to execute instructions provided from the instruction storage memory via a first instruction path, and to execute instructions provided by a second of the execution units via a second instruction path. The second of the execution units is configured to execute instructions provided from the instruction storage memory, and to provide instructions for execution to the first of the execution units via the second instruction path. The instruction merge unit is configured to merge the instructions provided via the first and second instruction paths into a stream of instructions to be executed by the first execution unit.

In another embodiment, a processor includes a primary execution unit, and a secondary execution unit coupled to the primary execution unit. The secondary execution unit is configured to provide instructions to the primary execution unit for execution by the primary execution unit in conjunction with execution of a given instruction by the secondary execution unit.

In a further embodiment, a processor includes a processor core, an instruction store, and a merge unit. The processor core includes a first execution unit and a second execution unit. The first execution unit includes registers and function logic, and is configured to execute instructions. The instruction store is configured to store instructions for execution by the first execution unit. The second execution unit includes registers and function logic, and is configured to: execute instructions, and to provide instructions to the first execution unit for execution in conjunction with an instruction executed by the second execution unit. The merge unit is coupled to the first execution unit and the second execution unit. The merge unit is configured to assign a priority value to each of the instruction store and the second execution unit, and to insert instructions from the instruction store and the second execution unit into a stream of instructions to be executed by the first execution unit in accordance with the assigned priorities. The merge unit is also configured to assert a wait signal to the first execution unit in conjunction with inserting an instruction from the second execution unit into the instruction stream to enable execution of the instruction from the second execution unit by the first execution unit.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In conventional processor architectures, interaction between processing units is typically limited to data/status transfer and issuance of instructions from a CPU to coprocessor. In such architectures, transfer of data and/or status between execution units is accomplished via execution of dedicated data movement instructions, such as load and store. Because coprocessors may be restricted to an instruction set focused on a particular application, such floating point computation, graphics computation, etc., functionality not supported by the coprocessor is provided by a CPU that executes instructions provided from instruction storage such as cache or instruction memory. However, requiring the execution of additional instructions to transfer data and/or status between execution units increases processor power consumption, program execution time, and storage. Similarly, limited execution interaction between execution units unnecessarily limits overall processor performance and increases power consumption by requiring that CPU support of a coprocessor be initiated from an instruction stream provided from memory.

Embodiments of the processor disclosed herein include execution units that are capable of accessing functionality in other execution units by issuing instructions directly from one execution unit to another. For example, an execution unit dedicated to vector processing can issue logical operation instructions to a different execution that supports such operations in situations where logical operations are needed to support a vector operation. Thus, in some embodiments of the present disclosure, functionality of each execution unit can be limited to reduce hardware cost, but overall processor performance improved by allowing the execution units to access needed functionality provided by other execution units. Embodiments further improve performance by allowing execution units to directly access registers of other execution units without use of dedicated data movement instructions. For example, operands to be processed in an instruction executed by one execution unit can be accessed in registers of a different execution unit in the course of execution of the instruction. Similarly, a result of execution of the instruction can be stored in a register of a different execution in the course of execution of the instruction.

Figure 1:
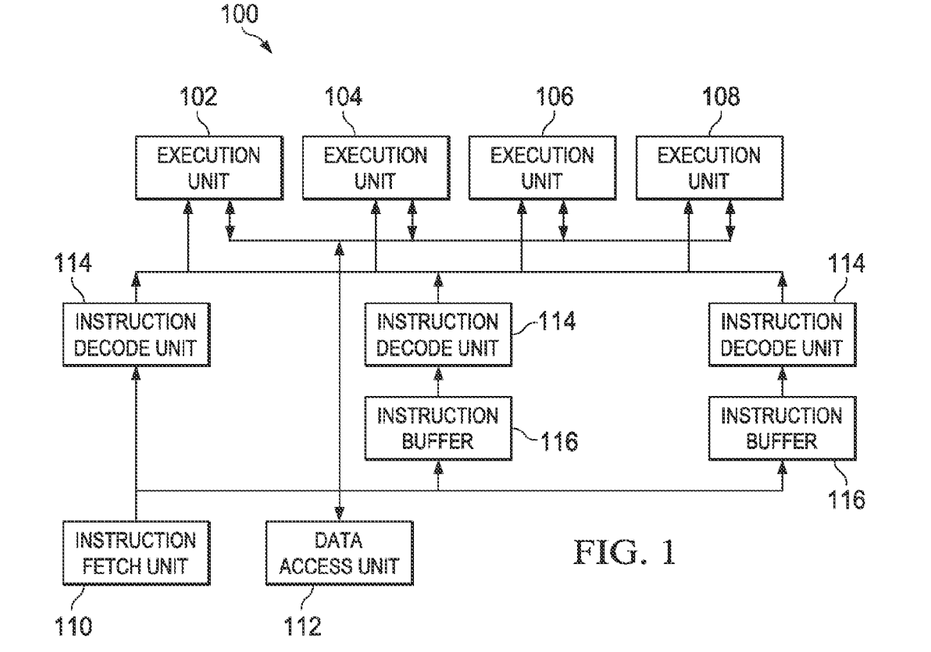
FIG. 1 shows a block diagram of a processor in accordance with various embodiments.

FIG. 1 shows a block diagram of a processor 100 in accordance with various embodiments. The processor 100 includes a plurality of execution units 102, 104, 106, 108. Other embodiments may include a different number of execution units. The processor 100 also includes an instruction fetch unit 110, a data access unit 112, and one or more instruction decode units 114. Some embodiments further include one or more instruction buffers 116. In some embodiments of the processor 100, two or more of the execution units 102-108 may be components of a single processor core. The processor 100 may also include other components and sub-systems that are omitted from FIG. 1 in the interest of clarity. For example, the processor 100 may include data/instruction storage resources, such as random access memory, communication interfaces and peripherals, timers, analog-to-digital converters, clock generators, debug logic, etc.

One or more of the execution units 102-108 can execute a complex instruction. For example, an execution unit (EU) 102-108 may be configured to execute a fast Fourier transform (FFT) instruction, execute a finite impulse response (FIR) filter instruction, an instruction to solve a trigonometric function, an instruction to evaluate a polynomial, an instruction to compute the length of a vector, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may stall until the execution unit 104 has produced the required result. In some embodiments, one execution unit (e.g., 102) may serve as a primary execution for the processor 100, and other execution units (e.g., 104-108) may serve as secondary execution units.

To facilitate efficient execution of complex and other data manipulation and processing instructions, an execution unit (e.g., 108) can access data and/or functionality of a different one or more of the execution units 102-106 as part of or in conjunction with execution of the instruction. For example, in executing an instruction, the execution unit 104 may access operands stored in execution unit 102, and/or store a result of processing the operands in execution unit 102. Similarly, an execution unit (e.g., 104) can execute status dependent instructions and instruction sequences based on status stored in different ones of the execution units (e.g., 102). Thus, a status dependent program flow control instruction executed by the execution unit 104 can be predicated on status stored in a different execution unit without requiring addition instructions to transfer the status to execution unit 104. An execution unit (e.g., 104) can access functionality of a different execution unit (e.g., 102) by issuing instructions to the execution unit 102 for execution. The instructions issued by execution 104 may be stored in execution unit 104 for issuance that is triggered by execution, in execution unit 104, of an instruction requiring the functionality provided by execution of the stored instructions in execution unit 102. Such instruction issuance may be triggered by a dedicated field of the instruction executed by execution unit 104, or by information stored in execution unit 104 indicating that and when stored instructions are to be issued to execution unit 102. For example, a state machine controlling execution of a given instruction in execution unit 104 may be arranged to issue stored instructions at a predetermined state of execution of the given instruction. Providing such interaction directly between execution units 102-108 allows processor components, such as memories, bus interfaces, etc. that are not involved in the interaction to stay in the current power state or to transition to a reduced power state, thereby reducing overall processor power consumption, without reduction in processor functionality.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. Instruction dispatch logic may be associated with the decode unit 114. As shown in FIG. 1, multiple execution units may receive decoded instructions from an instruction decoder 114. In some embodiments, an instruction decoder 114 may be dedicated to one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, an instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100, register of a peripheral device, etc.). Some embodiments of the processor 100 may include more than one data access unit 112, where each data access unit 112 may be coupled to one or more of the execution units 102-108.

The execution units 102-108 may be configured to execute the same instructions, or different instructions or any mix of same and different instructions. For example, given an instruction set that includes all of the instructions executable by the execution units 102-108, in some embodiments of the processor 100, all or a plurality of the execution units 102-108 may be configured to execute all of the instructions of the instruction set. Alternatively, some execution units 102-108 may execute only a sub-set of the instructions of the instruction set, or may execute a different instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in their current power state, which can be a low-power state. Thus, each execution unit 102-108 is able to independently control access to resources of the processor 100 (power, clock frequency, etc.) external to the execution unit needed to execute instructions, and to operate independently from other components of the processor 100.

Figure 2:
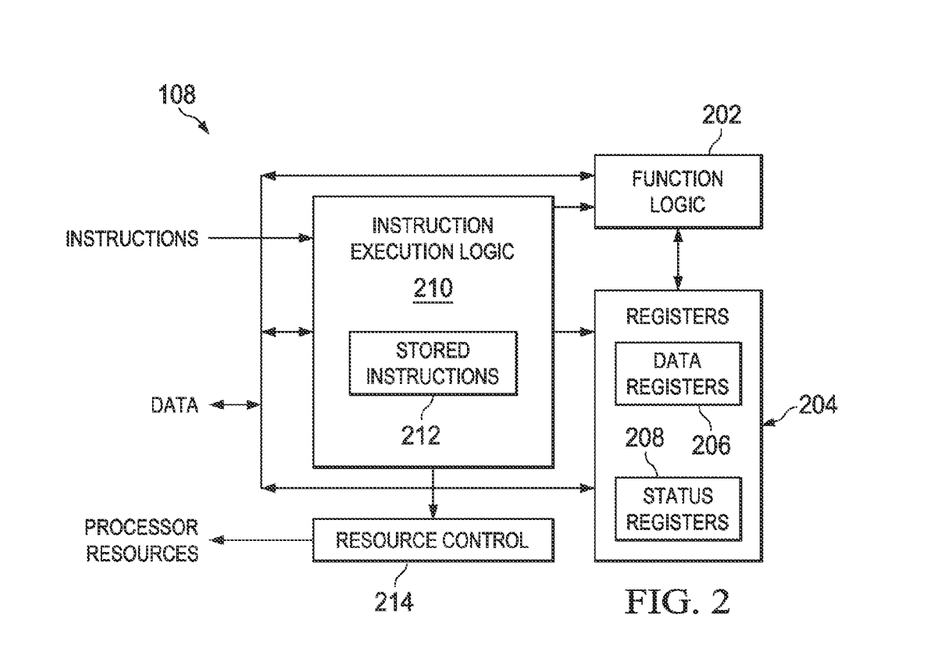
FIG. 2 shows a block diagram of an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands and/or pointers to operand to be processed by, and results produced by, the function logic 202. The data registers may also store addresses, control information, configuration information, etc. The number and/or size of registers included in the data registers 206 may vary across embodiments. For example, one embodiment may include 16 16-bit data registers, and another embodiment may include a different number and/or width of registers. The status registers 208 include one or more registers that store state information (condition codes) produced by operations performed by the function logic 202 and/or store instruction execution and/or execution unit state information. State information stored in a status register 208 may include a zero result indicator, a carry indicator, result sign indicator, overflow indicator, interrupt enable indicator, instruction execution state, etc.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control system that sequences the multiple successive operations of a complex instruction being executed by the execution unit 108.

As part of sequencing instruction execution, the instruction execution logic 210 can initiate and control issuance of instructions to the execution unit 102 and/or other execution units (e.g., execution units 102-106). The instruction execution logic 210 includes stored instructions 212 that the instruction execution logic 210 may issue to the execution unit 102 or a different execution unit to, for example, support execution of an instruction being executed by execution unit 108. For example, if execution of an instruction in execution unit 108 requires some particular operations that can only be performed by execution unit 102, in addition to operations that can be performed by execution unit 108, then the stored instructions 212 may include instructions that instruction execution logic 210 causes to be issued to execution unit 102 for performance of the particular operations. To optimize performance, the instruction execution logic 210 may issue the instructions with timing that results in generation of result by the different execution unit at or prior to a state of execution (or execution pipeline state) of the execution unit 108 in which the result is needed. Information applied by the instruction execution logic 210 to direct instruction issue may be derived from a field of an instruction being executed by the execution unit 108, included in a state machine, provided by previously executed instructions, or otherwise stored in or provided to the instruction execution logic 210.

The stored instructions 212 may be stored in volatile or non-volatile memory, registers, or coded in programmable or fixed logic circuitry. Instructions may be stored at any time prior issuance. For example, instructions may be pre-programmed at manufacture, loaded at run-time, etc. In some embodiments, the stored instructions 212 may be located outside the issuing execution unit.

Similarly, the instruction execution logic 210 controls access of registers 204 of other execution units as part of instruction execution sequencing. Registers of execution units to be accessed in executing an instruction may be identified by a field of the instruction being executed, coded into an instruction execution state machine, or stored in a register or memory of the execution unit 108 at any time prior register access.

The execution unit 108 also includes resource control logic 214. The resource control logic 214 requests access to the various resources (e.g., storage, power, clock frequency, etc.) of the processor 100 that the execution unit 108 uses to execute an instruction. By requesting processor resources independently for each execution unit 102-108, the power consumed by the processor 100 may be reduced by placing only components of the processor 100 required for instruction execution by an active execution unit 102-108 in an active power state. Furthermore, execution units 102-108 not executing instructions may be placed in a low-power state to reduce the power consumption of the processor 100.

Figure 3:
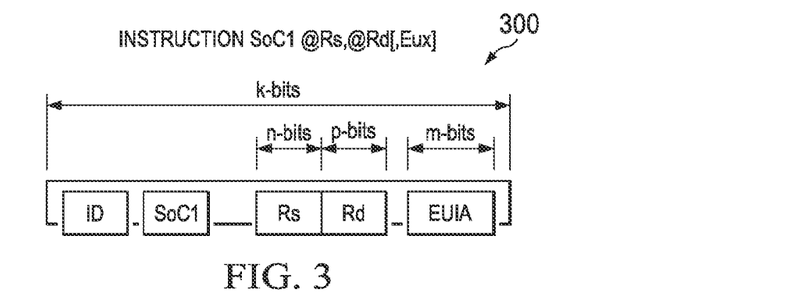
FIG. 3 shows an instruction that includes a field specifying inter-execution unit instruction issue in accordance with various embodiments.

FIG. 3 shows an instruction 300 executable by at least one of the execution units of the processor 100. The instruction 300 includes a field 302 specifying inter-execution unit instruction issue in accordance with various embodiments. Information provided in the EUIA field 302 may directly or indirectly (e.g., via pointer) specify whether an instruction is to be issued, to what execution unit the instruction is to issued, what instruction is to be issued, timing of instruction issue, and/or parameters of an instruction to be issued, etc. Some embodiments of the instruction 300 may include more than one EUIA field 302 where each EUIA field 302 is directed to issuance of one or more instructions to an execution unit.

Figure 4A:
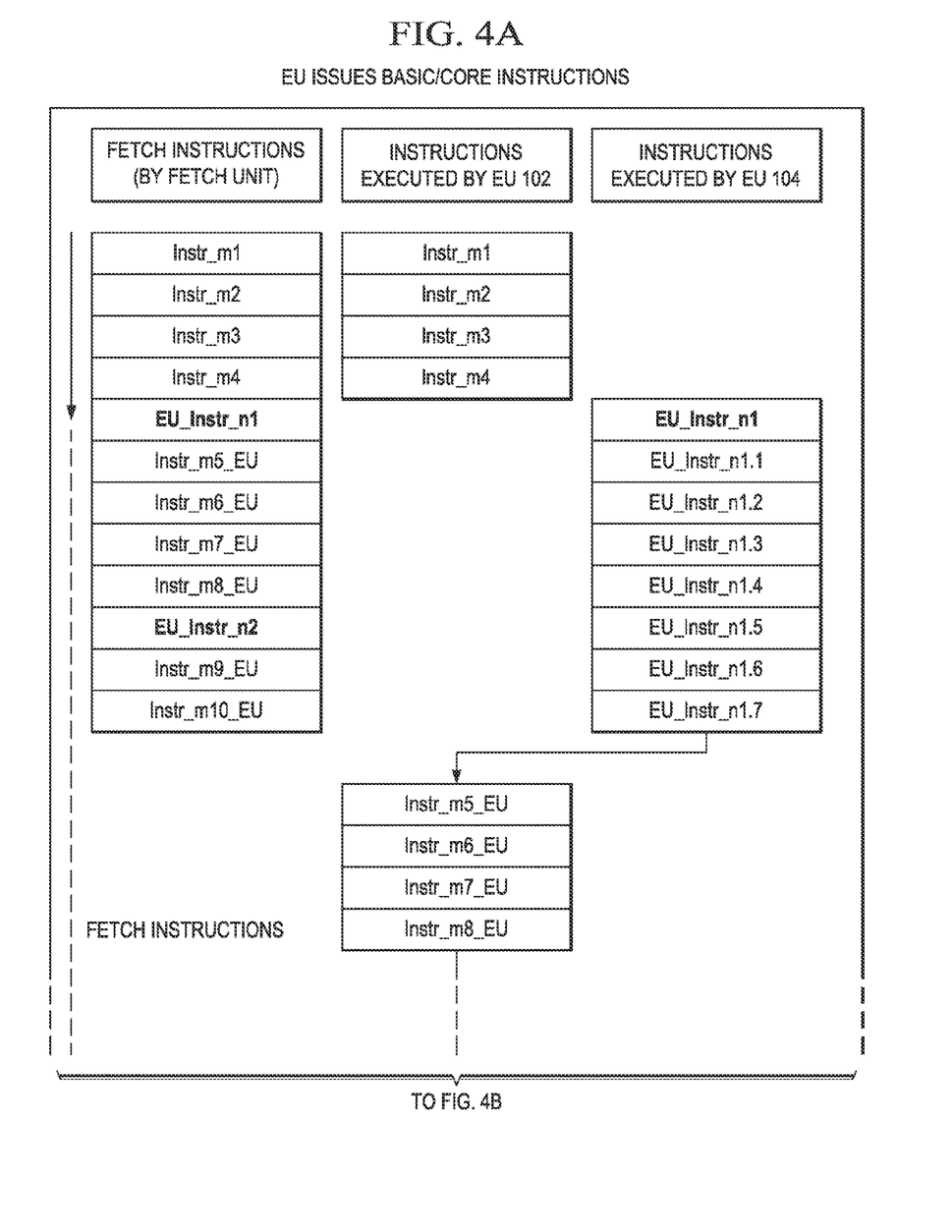
FIGS. 4A-4B shows execution interoperation including inter-execution unit instruction issue in accordance with various embodiments.
Figure 4B:
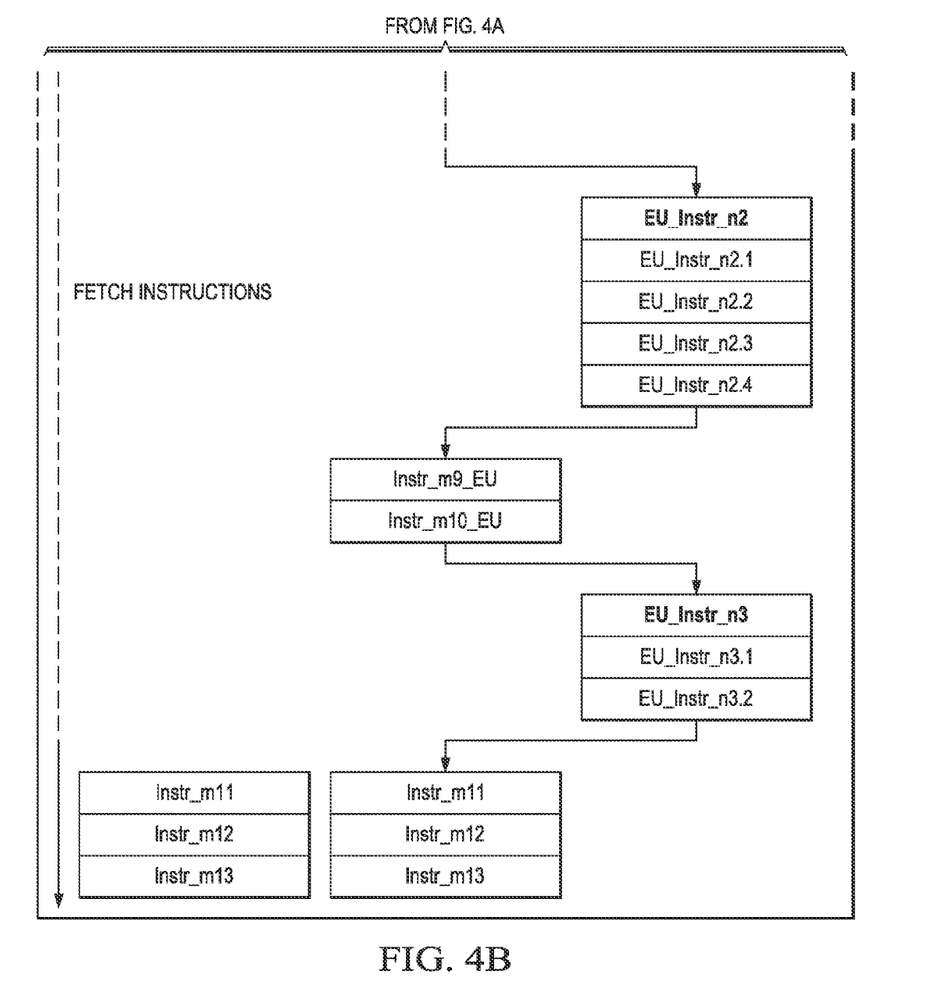

FIGS. 4A-4B show an example of execution interoperation including inter-execution unit instruction issue in accordance with various embodiments. In FIGS. 4A-4B, instructions Instr_m1 to Instr_m4 are fetched and executed by execution unit (EU) 102, which may be the CPU of the processor 100. Instruction EU_Instr_n1 is fetched next and directed to EU 104 for execution. EU 104 transitions through execution states EU_Instr_n.1.1 to EU_Instr_n1.7 while executing instruction EU_Instr_n1. EU 104 issues the instructions Instr_m5_EU to Instr_m8_EU to EU 102 for execution. For example, EU 104 may issue the instructions Instr_m5_EU to Instr_m8_EU from stored instructions 212 in conjunction with execution state EU_Instr_n1.7. The instructions Instr_m5_EU to Instr_m8_EU may, for example, cause EU 102 to further process a result of execution of the instruction EU_Instr_n1 while allowing instruction memories, bus components, etc. of the processor 100 to remain in a reduced power state. EU 104 next executes instruction EU_Instr_n2 and issues instructions Instr_m9_EU to Instr_m10_EU for execution by EU 102, and finally executes instructions EU_Instr_n3 and issues instructions Instr_m11_EU to Instr_m13_EU for execution by EU 102.

Figure 5:
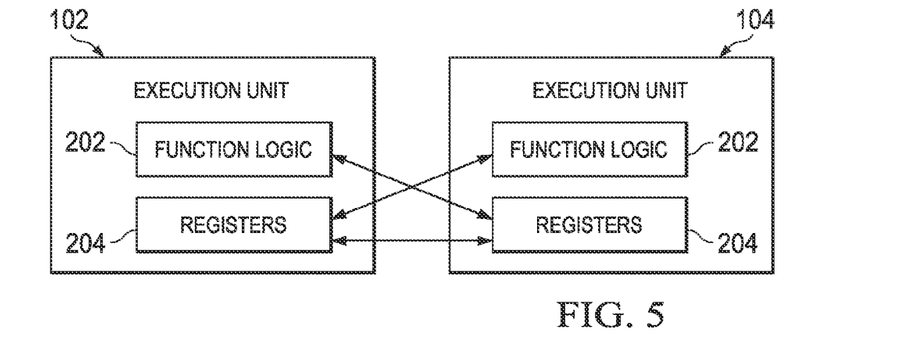
FIG. 5 shows a block diagram of execution units in a processor and data exchanges performed during execution unit interoperation in accordance with various embodiments.

FIG. 5 shows a block diagram of execution units 102, 104 in the processor 100 and data exchanges performed during execution unit interoperation in accordance with various embodiments. The execution unit 104, for example, can transfer data between the function logic 202 of the execution unit 104 and the registers 204 of the execution unit 102, and/or transfer data between the registers 204 of the execution unit 102 and the registers 204 of the execution unit 104. Such data transfers may be performed during instruction execution without additional cycle overhead, as would be required to transfer data between execution units using a different instruction (e.g., a load or store instruction). The transfers include providing data and/or status to the function logic 202 from the data registers 206 and/or status registers 208, and/or providing processing results and/or status to data registers 206 and/or status registers 208.

FIG. 5 also shows that the execution units 102, 104 can transfer data directly between the registers 204 of the different execution units. Accordingly, the execution units can perform a context switch by moving register contents from one execution unit to another. Thus, if the execution unit 102 needs to store context for an interrupt service, task switch, etc., and the registers of execution unit 104 are not in use, then the execution unit 102 can transfer the contents one or more of the registers 204 of the execution unit 102 to registers 204 of the execution unit 104. Registers of the execution unit 104 may be cleared in conjunction with the transfer to avoid residual data. Moving the contents of the registers 204 of the execution unit 104 to the registers 202 of the execution 102 restores the context. Thus, embodiments of the processor 100 reduce the energy and time expended in context switching by reducing the memory accesses required to store and restore register contents.

Figure 6:
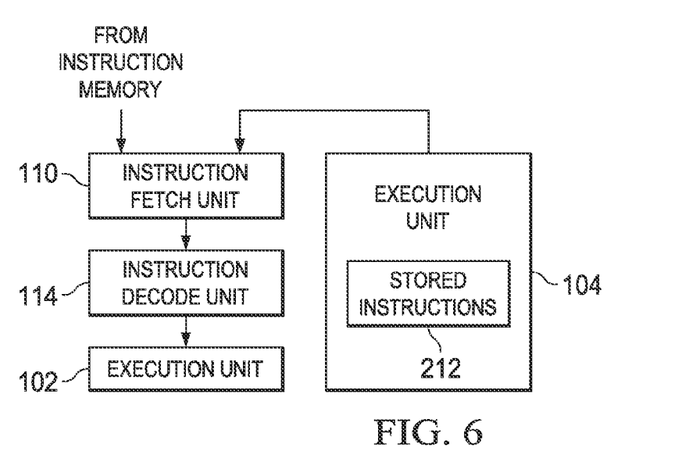
FIGS. 6-7 show block diagrams of exemplary execution units in a processor providing inter-execution unit instruction issue in accordance with various embodiments.

FIG. 6 shows a block diagram of execution units 102, 104 in the processor 100 providing inter-execution unit instruction issue in accordance with various embodiments. In FIG. 6, the execution unit 104 includes stored instructions 212. The execution unit 104 may be triggered to issue instructions to the execution unit 102 by execution of a particular instruction in the execution unit 104 that requires operations not provided by the execution unit 104. The particular instruction may specify the instructions to be issued, destination, parameters, etc., or such information may have been previously stored in the execution unit 104. In FIG. 6, the instructions issued by the execution unit 104 are routed to the instruction fetch unit 110, and are interleaved with instructions provided from an instruction memory, decoded by the instruction decode unit 114, and provided to the execution unit 102 for execution. In the embodiment of FIG. 6, the execution unit 104 may issue each instruction to the execution unit 102 individually.

Figure 7:
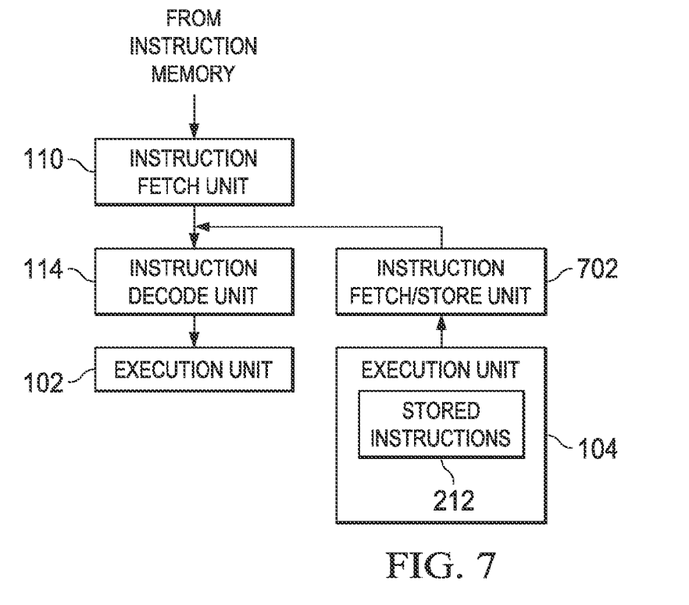

FIG. 7 shows a block diagram of an alternative arrangement of execution units 102, 104 in the processor 100 providing inter-execution unit instruction issue in accordance with various embodiments. In the embodiment of FIG. 7, instructions issued by the execution unit 104 are directed to the instruction fetch/store unit 702 and stored (e.g., in a fetch buffer or cache). Thus, the execution unit 104 may issue a number of instructions for execution by the execution unit 102, rather than issuing instructions individually as in the embodiment of FIG. 6. The instructions issued by the execution unit 104 are output by the fetch unit 702 and interleaved with instructions provided from instruction memory via the fetch unit 110, decoded by the decode unit 114, and provided to the execution unit 102 for execution. Instructions stored in the fetch/store unit 702 may be repeatedly issued therefrom as needed to the execution unit 102 thereby reducing processor 100 energy consumption. Repeated issue of instructions from the instruction fetch/store unit 702 may be controlled by the execution unit 104.

In some embodiments of the processor 100, an execution unit may indirectly issue instructions for execution by a different execution unit. For example, referring to FIG. 7, the execution unit 104 may provide an address value and number of instructions (or other information indicating what instructions are being issued) to the fetch unit 702. The fetch unit 702 may retrieve the instructions from storage, if the instructions are not already stored in the fetch unit 702, and provide the instructions to the execution unit 102 as described with regard to FIG. 7.

Figure 8:
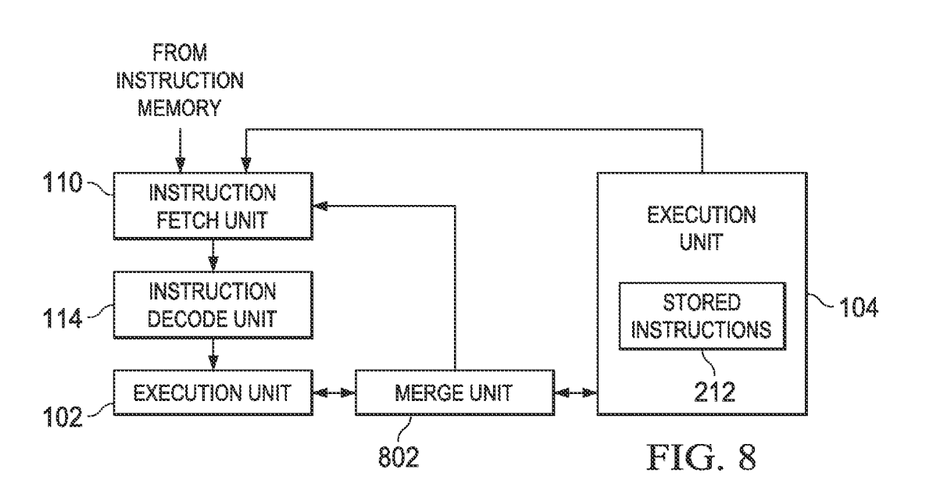
FIG. 8 shows a block diagram of a processor including a merge unit that manages integration of instructions issued from different sources in accordance with various embodiments.

FIG. 8 shows a block diagram of a portion of the processor 100 including a merge unit 802 that manages integration of instructions issued from different instruction sources in accordance with various embodiments. The merge unit 802 is coupled to the execution units 102, 104 and the instruction fetch unit 110. The merge unit 802 manages the merger of instructions provided from multiple instruction paths. In FIG. 8, one instruction path provides instructions to execution unit 102 from an instruction memory, and another instruction path provides instructions by issued by execution unit 104 to execution unit 102.

The merge unit 802 may apply a variety of techniques to manage the merger or interleaving of instructions provided via the different instruction paths. In one embodiment, the merger unit 802 may control the fetch unit 110 and/or the execution unit 104, and cause instructions to be provided to execution unit 102 from either instruction path. The merger unit 802 receives information from the execution unit 102 that indicates the execution state of execution 102. For example, execution unit 102 may indicate to the merge unit 802 whether the execution unit 102 is stalled, in a wait condition that inhibits execution of instructions from one or the other instruction path, etc. The execution unit 104 may indicate to the merger unit 802 that execution unit 104 is ready to issue instructions to execution unit 102.

Based on the information received from the execution units 102, 104 the merge unit 802 may control the execution units 102, 104 and the fetch unit 110 to direct instructions from a selected instruction source (e.g., instruction memory, execution unit 102, etc.) to execution unit 102 via the instruction path used by the source to provide instructions. For example, if the execution unit 102 is in a stalled state or is idle waiting for a time interval to expire or an event to occur, then the merge unit 802 may indicate to the execution unit 104 that instructions may be issued to the execution unit 102. In some embodiments, if execution unit 104 indicates to the merge unit 802 that the execution unit 104 is ready to issue instructions to the execution unit 102, then the merge unit 802 may assert a control signal to the execution unit 102 that causes the execution unit 102 to enter a stalled or idle state. Thereafter, the merge unit 802 may direct the execution unit 104 to issue instructions to the execution unit 102.

In some embodiments of the processor 100, the merge unit 802 may assign a priority to each instruction path or instruction source, and enable instructions to the execution unit 102 from each instruction path in accordance with the assigned priorities. For example, based on the assigned priorities, the merge unit 802 may allow instructions from a lower priority instruction path to be provided to the execution unit 102 only if no instructions are available via a higher priority instruction path, or the execution unit 102 is not enabled (e.g., idle or stalled) to execute instructions provided via the higher priority instruction paths.

The merge unit may also issue an interrupt to the execution unit 102, the service of which causes the execution unit 102 to execute instructions provided via a particular instruction path. The merge unit 802 may issue such an interrupt to the execution unit 102 when the execution unit 104 indicates that instructions are to be issued to the execution unit 102 by the execution unit 104. Alternatively, the merge unit 802 may assert a wait signal to the execution unit 102 that causes the execution unit 102 to stall or enter an idle state with respect execution of instructions from one instruction path (e.g., instructions from the instruction memory), and allows instructions issued by execution unit 104 to be executed.

In some embodiments, merge unit 802 may analyze the instructions provided via an instruction path to determine how many instructions from the path should be executed in sequence. For example, the instructions may include a field that specifies how many instructions are to be atomically executed, where atomic execution refers to execution without interruption. Similarly, the instruction source (e.g., execution unit 104) may indicate to the merge unit 802 how many instructions issued from the instruction source are to be executed without interruption.

The above discussion is meant to be illustrative of the principles and various embodiments of the present invention. Numerous variations and modifications will become apparent to those skilled in the art once the above disclosure is fully appreciated. For example, while various operations and functions of the processor 100 have been described with reference to particular execution units, it is to be understood that the described operations and functions are not limited to any particular execution units. It is intended that the following claims be interpreted to embrace all such variations and modifications.

What is claimed is:

1. A processor, comprising:
   an instruction storage memory;
   a processor core, comprising:
      a plurality of execution units coupled to the instruction storage memory, wherein:
         a first of the execution units is configured to execute instructions provided from the instruction storage memory via a first instruction path, and to execute instructions provided by a second of the execution units via a second instruction path; and
         the second of the execution units is configured to execute instructions provided from the instruction storage memory, and to provide instructions for execution to the first of the execution units via the second instruction path; and
      an instruction merge unit configured to merge the instructions provided via the first and second instruction paths into a stream of instructions to be executed by the first execution unit.

2. The processor of claim 1, wherein each of the execution units comprises registers, and the second of the execution units is configured to access registers of the first of the execution units.

3. The processor of claim 2, wherein the second of the execution units is configured to move data between registers of the first of the execution units and registers of the second of the execution units.

4. The processor of claim 2, wherein at least one of the registers of the first of the execution units that is accessed by the second execution unit is a status register.

5. The processor of claim 2, wherein the second of the execution units is configured to access a register of the first of the execution units in conjunction with execution of an instruction by the second of the execution units.

6. The processor of claim 2, wherein the second of the execution units is configured to, in conjunction with execution of an instruction:
   retrieve an operand from the first of the execution units to be processed by execution of an instruction;
   store a result of instruction execution in the first of the execution units; or
   store, in the first of the execution units, status produced by execution of an instruction.

7. The processor of claim 2, wherein the second of the execution units is configured to determine a location of data stored in the first of the execution unit to access in conjunction with execution of a given instruction based on information conveyed by the given instruction or information provided to the second of the execution units prior to execution of the given instruction.

8. The processor claim 2, wherein the first of the execution units is configured perform a context switch comprising simultaneously moving contents of a plurality of registers of the first of the execution units to registers of the second of the execution units.

9. The processor of claim 2, wherein the first of the execution units is configured to store a result of execution of an instruction provided via the second instruction path in a register of the second of the execution units.

10. The processor of claim 1, wherein the second of the execution units is configured to provide the instructions to the first of the execution unit for execution based on execution of a trigger instruction in the second of the execution units, and wherein the instructions provided to the first of the execution units are stored in the second of the execution units prior to execution of the trigger instruction.

11. The processor of claim 1, wherein the second of the execution units is configured to execute, responsive to execution of a given instruction, an instruction stored in the second execution prior to execution of the given instruction.

12. The processor of claim 1, further comprising an instruction buffer configured to:
provide instructions to the first of the execution units; and
receive and store instructions provided via the second instruction path for subsequent execution by the first of the execution units.

13. The processor of claim 12, wherein the instruction buffer is configured to:
store merge and execution control data along with:
an individual instruction; or
a block of instructions.

14. The processor of claim 1, wherein the second of the execution units is configured to provide the instructions for execution to the first execution unit by transferring information indicative of a location of the instructions to an instruction fetch unit that provides instructions to the first of the execution units.

15. The processor of claim 1, wherein the merge unit is configured to assign a priority value to each of the instruction paths, and to insert instructions from each instruction path into the stream of instructions based on the assigned priorities.

16. The processor of claim 15, wherein the merger unit is configured to assign precedence to the first instruction path unless:
interrupts are disabled in the first of the execution units;
instructions of the second instruction path being executed by the first of the execution units are atomically concatenated; or
the first of the execution units is stalled.

17. The processor of claim 1, wherein the merge unit is configured to enable execution of instructions from the second instruction path by asserting a wait signal to the first of the execution units in conjunction with inserting an instruction from the second instruction path into the instruction stream.

18. A processor, comprising:
a processor core, comprising:
a primary execution unit; and
a secondary execution unit coupled to the primary execution unit;
wherein the secondary execution unit is configured to provide instructions to the primary execution unit for execution by the primary execution unit in conjunction with execution of a given instruction by the secondary execution unit;
wherein:
the primary execution unit comprises registers and the secondary execution unit comprises registers;
the primary execution unit is configured to transfer operands from the registers of the secondary execution unit and transfer results of instruction execution to a register of the secondary execution unit, and
the secondary execution unit is configured to transfer operands from the registers of the primary execution unit and transfer results of instruction execution to a register of the primary execution unit.

19. A processor, comprising:
a processor core, comprising:
a primary execution unit; and
a secondary execution unit coupled to the primary execution unit;
wherein the secondary execution unit is configured to provide instructions to the primary execution unit for execution by the primary execution unit in conjunction with execution of a given instruction by the secondary execution unit;
a merge unit coupled to the primary execution unit and the secondary execution unit, wherein the merge unit is configured to:
merge instructions provided by the secondary execution unit to the primary execution unit with instructions provided to the primary execution unit from instruction memory into a stream of instructions to be executed by the primary execution unit;
assign a priority value to the secondary execution unit and the instruction memory and insert instructions provided from the secondary execution unit and the instruction memory into the stream in accordance with the assigned priority values.

20. The processor of claim 19, wherein the merge unit is configured to enable execution of instructions provided by the secondary execution unit by asserting a wait signal to the primary execution unit in conjunction with inserting an instruction from the secondary execution unit into the stream.

21. A processor, comprising:
a processor core, comprising:
a first execution unit comprising registers and function logic, and configured to execute instructions; and
a second execution unit comprising registers and function logic, and configured to:
execute instructions; and
provide instructions to the first execution unit for execution in conjunction with an instruction executed by the second execution unit; and
an instruction store configured to store instructions for execution by the first execution unit;
a merge unit coupled to the first execution unit and the second execution unit, and configured to:
assign a priority value to each of the instruction store and the second instruction unit, and to insert instructions from the instruction store and the second instruction unit into a stream of instructions to be executed by the first execution unit in accordance with the assigned priorities;
assert a wait signal to the first execution unit in conjunction with inserting an instruction from the second execution unit into the instruction stream to enable execution of the instruction from the second execution unit by the first execution unit.

22. The processor of claim 21, wherein:
the first execution unit is configured to access a register of the second execution unit as part of execution of an instruction provided by the second execution unit; and
the second execution unit is configured to access a register of the first execution unit as part of execution of an instruction by the second execution unit.

* * * * *